(12) United States Patent
Crook et al.

(10) Patent No.: US 11,309,831 B2
(45) Date of Patent: Apr. 19, 2022

(54) SOLAR PANEL GUARD SYSTEM

(71) Applicants: Tyler Crook, Herriman, UT (US); Cory Sosa, South Jordan, UT (US)

(72) Inventors: Tyler Crook, Herriman, UT (US); Cory Sosa, South Jordan, UT (US)

(*) Notice: Subject to any disclaimer, the term of this patent is extended or adjusted under 35 U.S.C. 154(b) by 0 days.

(21) Appl. No.: 17/220,374

(22) Filed: Apr. 1, 2021

(65) Prior Publication Data
US 2021/0399680 A1 Dec. 23, 2021

Related U.S. Application Data

(60) Provisional application No. 63/042,159, filed on Jun. 22, 2020.

(51) Int. Cl.
*H02S 30/10* (2014.01)

(52) U.S. Cl.
CPC ................... *H02S 30/10* (2014.12)

(58) Field of Classification Search
CPC ........................................ H02S 30/10
See application file for complete search history.

(56) References Cited

U.S. PATENT DOCUMENTS

| 11,175,038 B2* | 11/2021 | Fox | F24C 3/126 |
|---|---|---|---|
| 2012/0304567 A1 | 12/2012 | Baker et al. | |
| 2016/0043689 A1* | 2/2016 | McPheeters | F24S 25/61 |
| | | | 248/231.31 |
| 2016/0111995 A1* | 4/2016 | Nayar | F24S 25/613 |
| | | | 211/41.1 |
| 2017/0302219 A1* | 10/2017 | Rothschild | H02S 20/20 |

OTHER PUBLICATIONS https://snapnrack.com/wp-content/uploads/2019/05/SnapNrack_Array_Edge_Screen_Brochure.pdf, retrieved Mar. 31, 2021.
https://solatrim.com/wp-content/uploads/2017/09/SolaTrim_Specifications_Sheet.pdf?hsCtaTracking=24b96a20-4a62-4f57-9e8e-449a159b34c0%7Cb49f4c8c-fdd8-479e-8475-774b4ab4ea75, retrieved Mar. 31, 2021.
https://birdbarrier.com/brochure/solar-panel-protection.pdf, retrieved Mar. 31, 2021.
https://www.nixalite.com/SiteContent/Documents//PDFs//Solar%20Panel%20Exclusion%20Kit.pdf, retrieved Mar. 31, 2021.
http://www.spiffysolar.com/v/vspfiles/assets/SpiffyClipSpecSheet-Web.pdf, retrieved Mar. 31, 2021.
Snapnrack, Array Edge Screen Fastener, Solar Mounting Solutions, part Nos. 242-04105.
SnapNrack Solar Mounting Solutions, Array edge screen. https://www.youtube.com/watch?v=cfM6rBYZdso, retrieved Mar. 31, 2021.

* cited by examiner

*Primary Examiner* — Jayne L Mershon
(74) *Attorney, Agent, or Firm* — Lowenstein Sandler LLP

(57) ABSTRACT

A solar panel guard system includes a bracket that includes a clip disposed at a first distal end of the bracket. The clip is configured to removably attach to a solar panel. The bracket further includes a leg extending from the clip to a second distal end of the bracket. The solar panel guard system further includes a guard structure including an upper edge configured to be disposed proximate the solar panel and a lower edge configured to be disposed proximate a surface that is disposed under the solar panel. The guard structure is configured to prevent objects from entering under the solar panel. The solar panel guard system further includes a fastening device configured to removably secure the guard structure to the leg of the bracket via an opening formed by the guard structure.

20 Claims, 9 Drawing Sheets

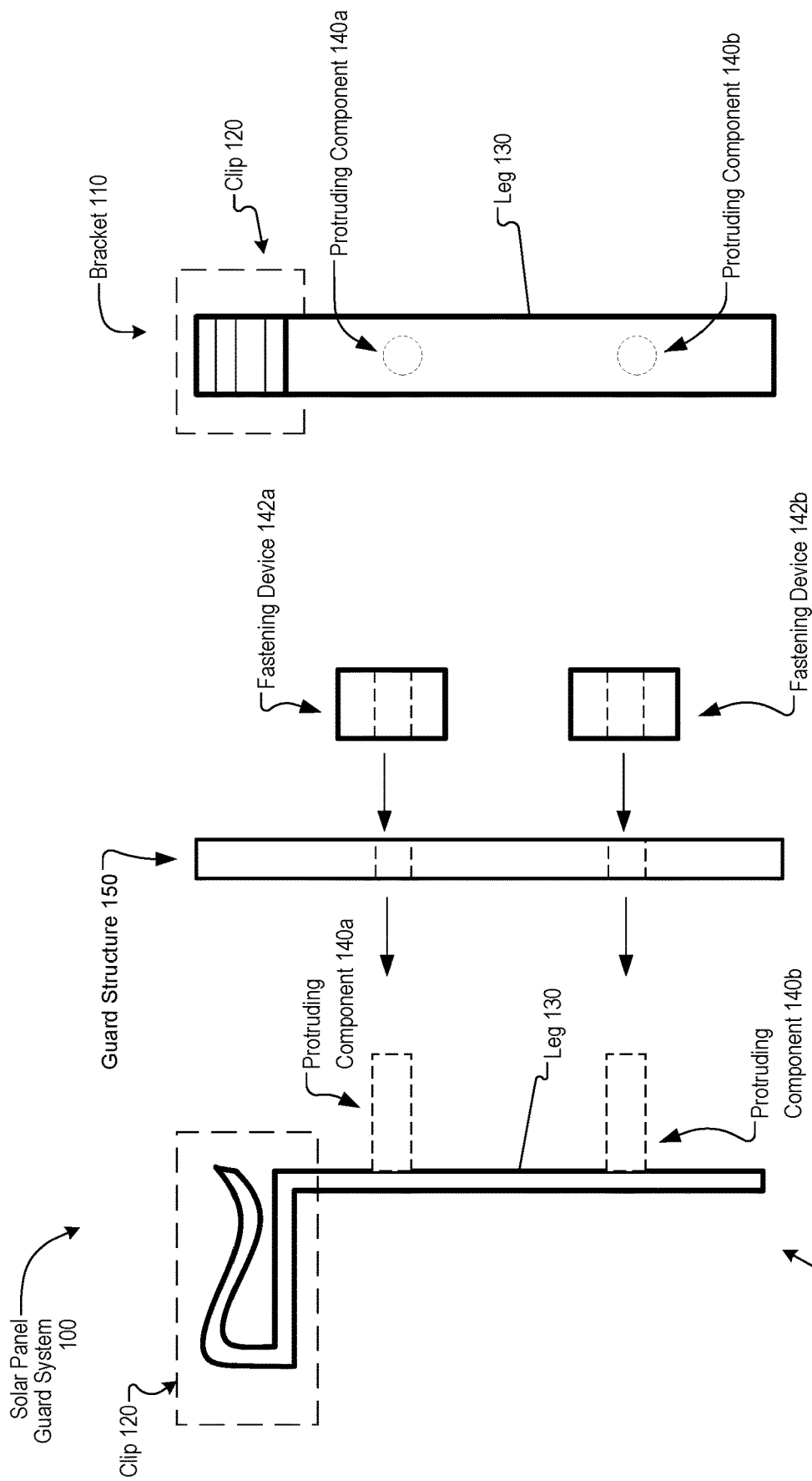

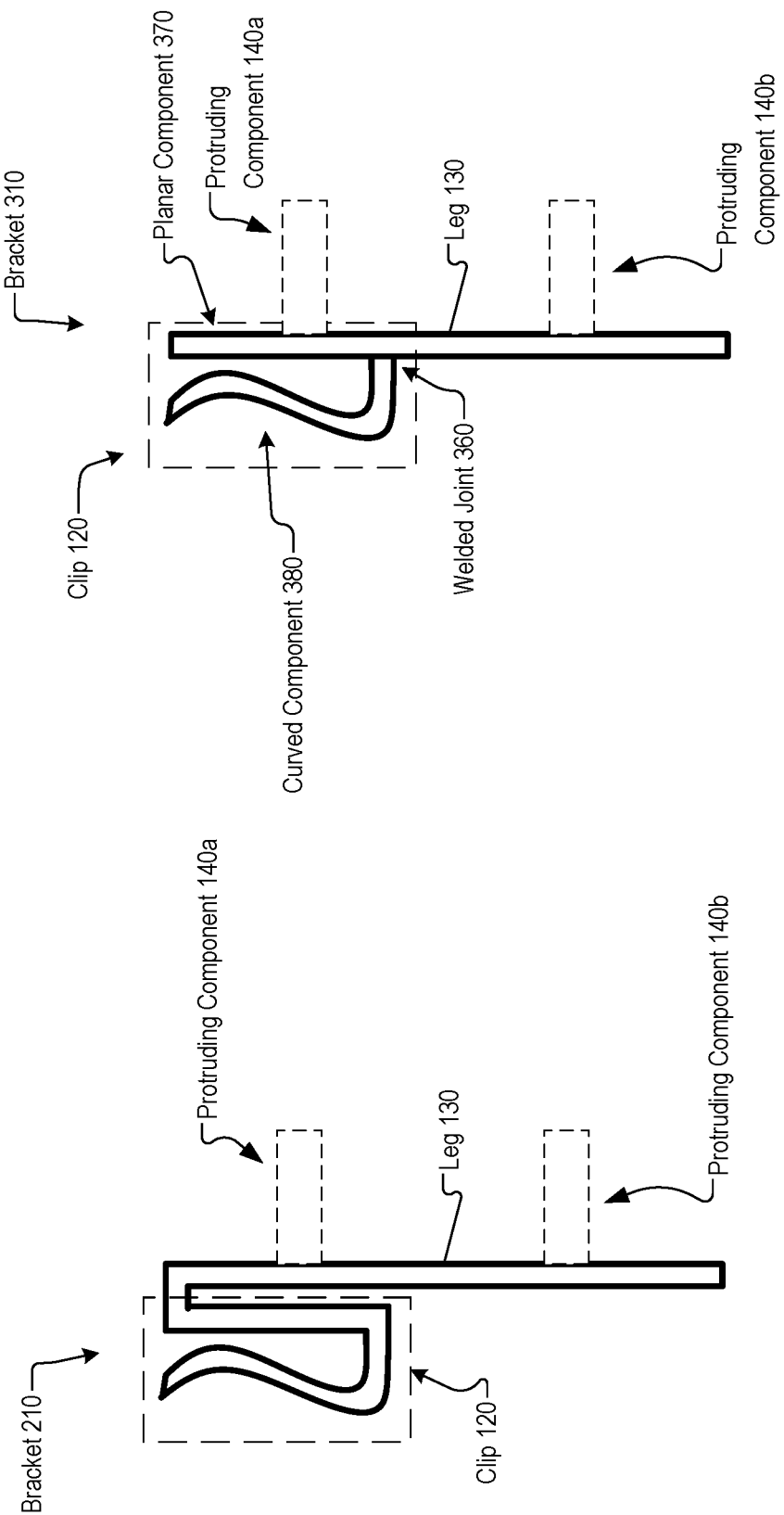

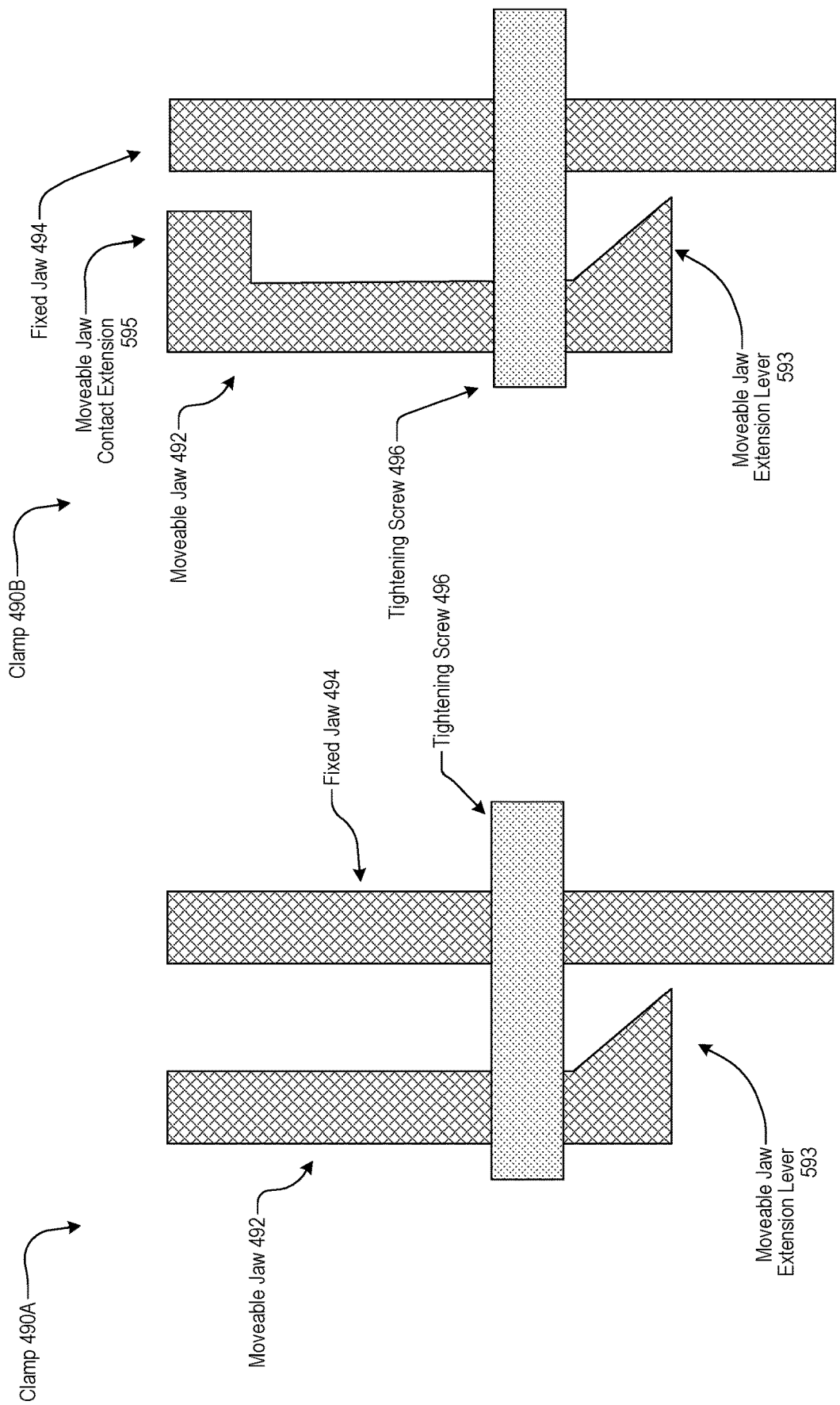

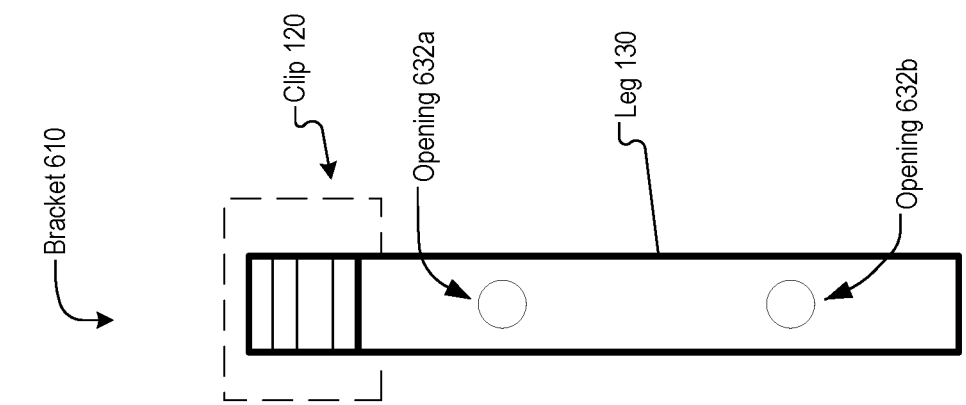
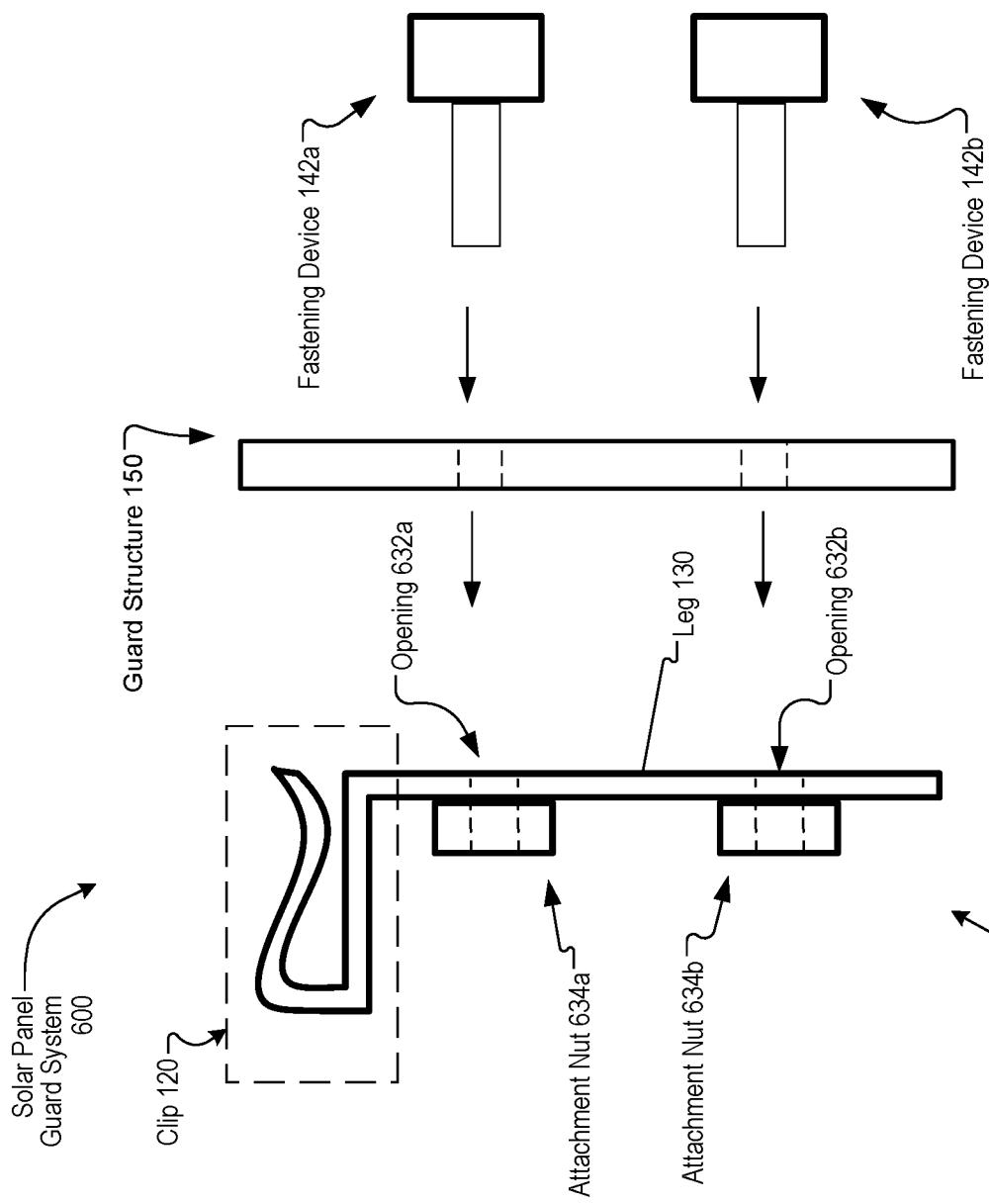

SOLAR PANEL GUARD SYSTEM

RELATED APPLICATIONS

This application claims the benefit of U.S. Provisional Application 63/042,159, filed Jun. 22, 2020, the entire contents of which are incorporated herein by reference.

TECHNICAL FIELD

Embodiments of the present disclosure relate to a guard system, and in particular to a solar panel guard system.

BACKGROUND

Solar panels are installed on surfaces, such as roofs of homes and other buildings. Solar panels are installed with a clearance above the surfaces for air circulation under the solar panels. It is possible for animals and debris to enter into the clearance space under solar panels.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding only.

FIG. 1A is a schematic diagram illustrating an exploded side view of a solar panel guard system, according to certain embodiments.

FIG. 1B is a schematic diagram illustrating a front view of a bracket of a solar panel guard system, according to certain embodiments.

FIG. 2 is a schematic diagram illustrating a side view of a bracket of a solar panel guard system, according to certain embodiments.

FIG. 3 is a schematic diagram illustrating a side view of a bracket of a solar panel guard system, according to certain embodiments.

FIG. 5A is a schematic diagram illustrating a cross-sectional side view of a clamp of a bracket of a solar panel guard system, according to certain embodiments.

FIG. 5B is a schematic diagram illustrating a cross-sectional side view of a clamp of a bracket of a solar panel guard system, according to certain embodiments.

FIG. 6A is a schematic diagram illustrating a side view of a solar panel guard system, according to certain embodiments.

FIG. 6B is a schematic diagram illustrating a front view of a bracket of a solar panel guard system, according to certain embodiments.

DETAILED DESCRIPTION

Figure 4B:
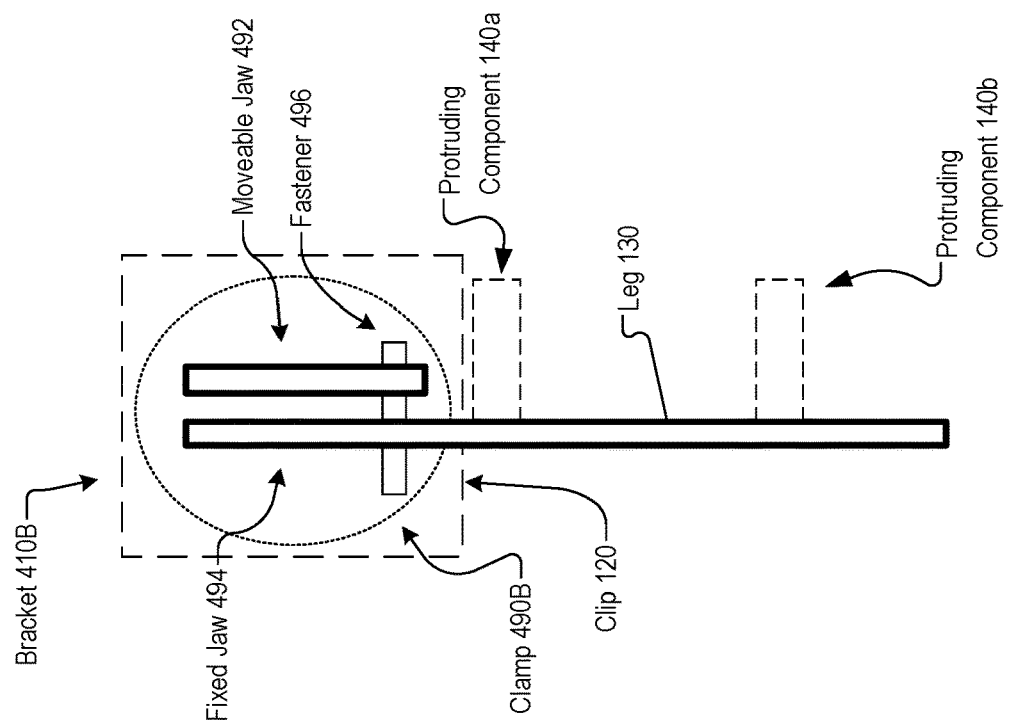
FIG. 4B is a schematic diagram illustrating a side view of a bracket of a solar panel guard system, according to certain embodiments.

Embodiments described herein are related to a solar panel guard system.

In the solar panel industry, animal and debris intrusions negatively affect the long-term functionality of solar panel systems. Animals (e.g., squirrels, chipmunks, birds, etc.) can damage components of solar panel systems which are costly to repair. Because solar panels are often mounted to the roofs of homes and buildings, animals and debris are able to enter the space between the solar panel and the roof of the building. Animals that get into the space under the solar panels may construct nests, bringing in foreign material which may pose a significant fire hazard, or otherwise damage the roof of the structure the solar panel is mounted to. Additionally, if birds construct their nest under the solar panels, the increased bird presence around the solar panels tends to result in a large amount of bird droppings on the solar panels which affects efficiency of the solar panel. Squirrels and other rodents also chew on exposed wires under solar panels. With enough chewing, the exposed wires will become permanently damaged, requiring costly repair or replacement.

Conventional systems to combat animal and debris intrusion into the space under solar panels or solar panel arrays include a flexible physical barrier which animals can easily push under. Even when mounted as designed, these conventional flexible physical barriers are not sufficiently rigid to keep animals from pushing under the flexible physical barrier at locations midway between mounting points. Additionally, conventional flexible physical barriers are not durable over time. Conventional flexible physical barriers are subject to damage from squirrels or other rodents chewing on the flexible physical barriers, which permanently damages the flexible physical barrier and allows animals to enter the solar panels.

Some conventional systems use a plastic clip to attach the flexible physical barrier to the solar panels. Over time, the plastic clips fall off the solar panel due to weather, snow build-up, or other natural forces, allowing animals to enter the space under the solar panels. Some plastic clips of conventional systems are damaged by the temperature changes that occur over the course of the seasons. These plastic clips fatigue and break, no longer support the flexible physical barrier, and thereby allowing animal and debris intrusions.

Some conventional systems use adhesives to fasten the flexible physical barrier to the sides of the solar panel. Adhesives break down over time. Adhesives do not provide the strength to be effective at securing the flexible physical barrier which keeps animals and debris from intruding. Conventional systems using adhesive cannot be removed and re-attached.

The devices, systems, and methods disclosed herein provide a solar panel guard system that prevents animals and debris from entering the space under a solar panel. The solar panel guard system may include a bracket (e.g., metal bracket) having a clip disposed at a first distal end of the bracket, where the clip facilitates fastening the bracket to the lip of the solar panel. The clip may be configured to removably attach to the solar panel. The clip may be a clip structure. The bracket may also include a leg extending from the clip. The leg may be a leg structure (e.g., the clip structure and the leg structure may be part of the same structure or may be separate structures). The leg of the bracket may include one or more points of attachment for one or more fastening devices (e.g., fasteners). The points of attachment may be protruding components of the leg. In one embodiment, one or more protruding components protrude substantially perpendicularly from the leg and each is configured to accept a corresponding fastening device. A first protruding component may be closer to the clip end (e.g., first distal end of the bracket) and a second protruding component may be closer to the second distal end of the bracket (e.g., distal end of the leg), opposite the clip. A guard structure (e.g., rigid sheathing, rigid metal sheathing, perforated guard structure, perforated barrier, perforated metal, plastic mesh, wire mesh, screen, and/or the like) may be attached to one or more brackets of the solar panel guard system. The one or more brackets may be attached to a solar panel or a solar panel array. The protruding components may facilitate fastening the guard structure to the bracket.

In some embodiments, the bracket is constructed of one or more of a metal, ceramic, plastic, or durable material. The bracket may have more strength and rigidity than conventional systems for combating animal and debris intrusions into the space under solar panels. The bracket may also be more resilient to weather and temperature changes, and may hold up better over time when compared to other brackets used in similar applications. Constructing the bracket of a durable material (e.g., metal) also gives the bracket more strength which allows the bracket to hold a heavier and stronger guard structure (e.g., sheathing material) to better prevent animal and debris intrusions into the space under a solar panel.

The systems, devices, and methods disclosed herein have advantages over conventional systems. The guard structure of the present disclosure may be more rigid and may prevent animals from pushing under the guard structure as animals can with conventional systems. The guard structure of the present disclosure may provide rigidity over the entire span of the guard structure between brackets to which the guard structure is fastened compared to conventional systems that are less rigid, so animals can push under conventional systems at the mid-points between mounting brackets. The guard structure of the present disclosure may be more durable over time compared to conventional systems. The guard structure of the present disclosure may also have the advantage of being self-securing where the guard structure may be secured to a lip of a solar panel (without fasteners securing the guard structure directly to the solar panel) by the guard structure extending above a bottom surface of the solar panel to prevent the bracket from disengaging from the lip of the solar panel.

FIG. 1A is a schematic diagram illustrating an exploded side view of a solar panel guard system 100, according to certain embodiments. Solar panel guard system 100 may include a bracket 110. The bracket 110 may removably attach to a solar panel (e.g., see FIG. 9). In some embodiments, the bracket 110 may attach to an underside (e.g., lip on the underside) of a solar panel.

Bracket 110 may be made of a rigid material. In some embodiments, bracket 110 is made of metal. In some embodiments, bracket 110 is made of spring steel (e.g., low-alloy manganese, medium-carbon steel, high-carbon steel). Bracket 110 may be made of an alloy of steel having a high yield strength (e.g., 60-220 kilopounds per square inch (ksi)). In some embodiments, bracket 110 is made of aluminum. In other embodiments, bracket 110 is made of plastic. In some embodiments, bracket 110 is made of a temperature resistant plastic. Bracket 110 may be made of a ultra-violet (UV) resistant plastic.

The bracket 110 of the solar panel guard system 100 may include a clip 120. The clip may be a clip structure. Clip 120 may be disposed at a first distal end of bracket 110. Clip 120 may facilitate removably attaching bracket 110 to a solar panel (e.g., clip 120 may be configured to removably attach to a solar panel). Clip 120 may attach to a lip of a solar panel. A lip of a solar panel may be a portion (e.g., structure, ledge, etc.) of a solar panel disposed under the top surface of the solar panel. In some embodiments, clip 120 attaches to a lower lip of a solar panel.

Clip 120 may provide a squeezing or clamping force on the solar panel. At least a portion of clip 120 may elastically deform when bracket 110 is installed on a solar panel. The elastic deformation of at least a portion of clip 120 may provide a clamping force. The clamping force on the solar panel may create a squeezing force which may hold the clip 120 on the lip of the solar panel to which the bracket 110 may be installed. Clip 120 may squeeze the lip of the solar panel to which the bracket 110 may be installed. Clip 120 may be flexible. In some embodiments, clip 120 may be resilient to deformation caused by outside forces such as pushing by animals.

One or more inside surfaces of clip 120 may include protrusions (e.g., teeth, coating, etc.) to provide a friction fit with the lip of the solar panel. One or more inside surfaces of clip 120 may be lined with a rubber or rubberized coating. The rubber or rubberized coating may increase a grip of clip 120 on the lip of the solar panel to retain the bracket 110 in a position on the solar panel. In some embodiments, clip 120 includes a fastener which protrudes through at least one surface of clip 120 to secure the clip 120 to the solar panel (e.g., see FIGS. 4A-B and 5A-B). The fastener may be a screw.

The bracket 110 of the solar panel guard system 100 may include a leg 130. The leg 130 may be a leg structure. Leg 130 may extend from clip 120 to a second distal end of bracket 110. In some embodiments, leg 130 is oriented substantially perpendicular to clip 120 (e.g., see FIGS. 1A-B). When bracket 110 is removably attached to a solar panel, leg 130 may extend substantially downward from clip 120. In some embodiments, leg 130 extends toward a surface disposed under the solar panel. The surface disposed under the solar panel may be a roof of a structure to which the solar panel is mounted. Leg 130 may be sufficiently rigid to resist bending moments caused by an animal pushing on or under leg 130. Leg 130 may be configured to support a guard structure 150.

Leg 130 may have one or more portions (e.g., protrusion, opening, internal threading, external threading, etc.) configured to couple (e.g., removably attach) to a corresponding fastening device 142 (e.g., bolt, screw, nut, wing nut, etc.). In some embodiments, leg 130 has two portions (i.e., as shown in FIG. 1). In some embodiments, leg 130 has more than two portions. In some embodiments, the one or more portions of the leg 130 face an outward direction. In some embodiments, the one or more portions of the leg 130 face an inward direction. The one or more portions of the leg 130 may include one or more protruding components 140. The one or more protruding components 140 may outwardly protrude substantially perpendicularly from a main body of the leg 130 (e.g., the main body extends from the clip 120 to a distal end of the bracket 110, the clip 120 is oriented substantially perpendicular to the main body of the leg 130, etc.). In some embodiments, the one or more protruding components 140 inwardly protrude from a main body of the leg (i.e., the direction opposite as shown in FIG. 1). The one or more portions of the leg 130 may form one or more openings in the leg 130 (e.g., in the main body of the leg 130, see FIGS. 6A-B). The openings may be holes or channels. The one or more portions of the leg 130 may be threaded. In some embodiments, the one or more portions of the leg 130 are threaded studs (e.g., removably secured to leg 130 or permanently secured to leg 130). In some embodiments, the one or more portions of leg 130 are threaded holes. The threaded holes may include one or more nuts welded to a back side of leg 130 (e.g., see FIG. 6A). In some embodiments, the one or more portions of leg 130 are protruding component 140a and protruding component 140b.

Figure 10:
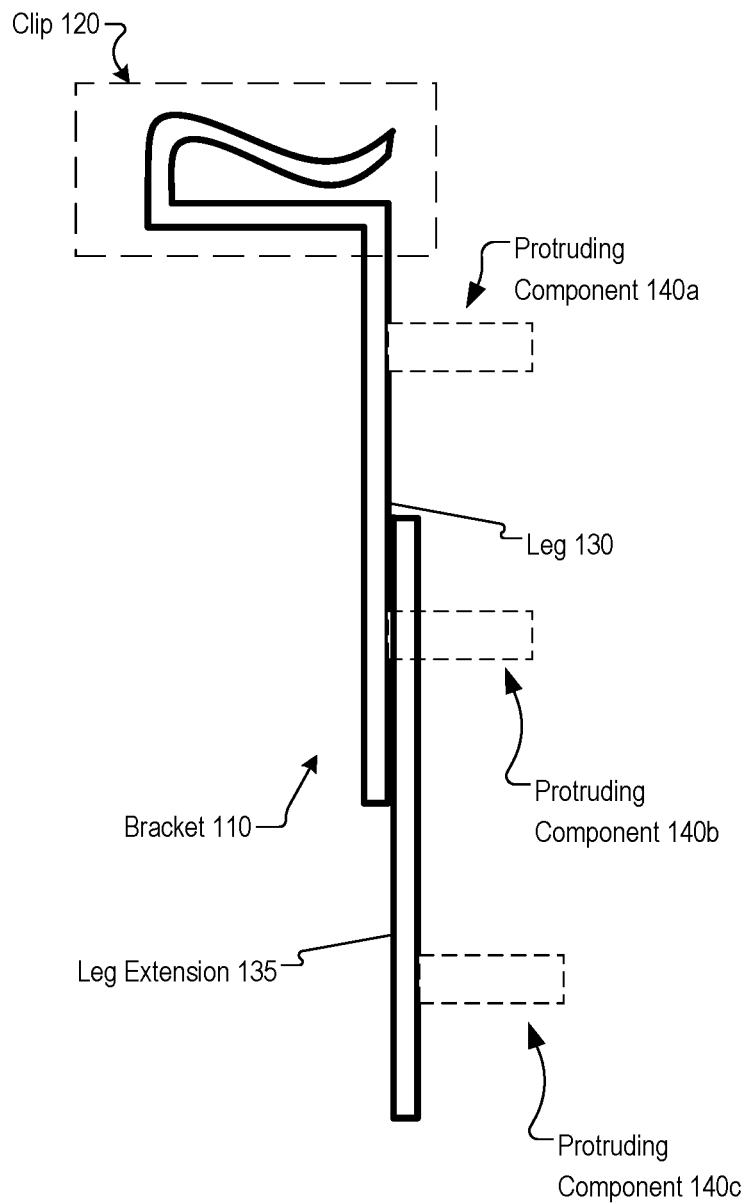
FIG. 10 is a schematic diagram illustrating a bracket of a solar panel guard system, according to certain embodiments.

Leg 130 may be configured to be extended by an extension structure (e.g., see FIG. 10). The extensions structure may be configured to removably attach to and extend from the second distal end of the bracket. The extension structure may be leg extension 135 (see FIG. 10). In some embodiments, the leg extension 135 attaches to leg 130 and effectively extends the length of bracket 110. The leg extension 135 may be configured to support at least a portion of a guard structure. The leg extension 135 may include one or more portions (e.g., protrusion, opening, internal threading, external threading, etc.) configured to couple (e.g., removably attach) to a corresponding fastening device. The leg extension 135 may include at least protruding component 140c (see FIG. 10). In some embodiments, the leg extensions 135, together with leg 130, supports guard structure 150.

Protruding component 140a and protruding component 140b may be substantially identical. Protruding component 140a and protruding component 140b may be threaded fasteners. Protruding component 140a and protruding component 140b may be threaded studs. In some embodiments, protruding component 140a and protruding component 140b are bolts. In some embodiments, protruding component 140a and protruding component 140b are screws. Protruding component 140a and protruding component 140b may be fasteners which retain a corresponding fastening device by force of friction. Protruding component 140a and protruding component 140b may be configured to connect to a fastening device. Protruding component 140a and protruding component 140b may be configured to accept a fastener such as a nut or a washer. Protruding component 140a and protruding component 140b may be configured to support a guard structure 150. In some embodiments, protruding component 140a and protruding component 140b and one or more fastening devices 142 may fasten a guard structure 150 to leg 130. Protruding component 140a and protruding component 140b and one or more fastening devices 142 may retain or secure a guard structure 150. Protruding component 140a and protruding component 140b and one or more fastening devices 142 may fasten a guard structure 150 that is perforated to bracket 110.

Solar panel guard system 100 may include guard structure 150. Guard structure 150 may be configured to attach to bracket 110. Guard structure 150 may be attached to bracket 110 by one or more fasteners such as screws, bolts, nuts, or nails. Guard structure 150 may also be attached to bracket 110 via one or more cable ties (e.g., zip ties) or other tying device (e.g., a twist tie). In some embodiments, guard structure 150 is installed on an outboard side of bracket 110 (i.e., an exterior side of the solar panel guard system 100). In some embodiments, guard structure 150 is installed on an inboard side of bracket 110 (i.e., an interior side of the solar panel guard system 100, the guard structure 150 is disposed between the area under the solar panel and the bracket 110). When guard structure 150 is installed on an inboard side of bracket 110, guard structure 150 may be installed on inwardly facing portions of leg 130.

Guard structure 150 may be a perforated barrier. When installed as part of a solar panel guard system 100, guard structure 150 may block the intrusion of animals and/or foreign material (e.g., debris, leaves, etc.) into a space below a solar panel. Guard structure 150 may cover an area between an edge of a solar panel and a surface (e.g., roof, pad, cement, ground, etc.) below a solar panel. Guard structure 150 may include an upper edge configured to be disposed proximate a solar panel and a lower edge configured to be disposed proximate a surface that is disposed under the solar panel. In some embodiments, guard structure 150 covers an area between an edge of a solar panel and a top surface of a structure to which the solar panel is mounted. Guard structure 150 may have a height of about 3 to about 6 inches (e.g., an installed height between three and six inches inclusive). In some embodiments, guard structure 150 may have a height of about 4 to about 5 inches. In some embodiments, guard structure 150 may have a thickness of about 0.02 to about 0.4 inches, about 0.25 to about 0.3 inches, about 0.27 inches or larger.

Guard structure 150 may be rigid. Guard structure 150 may be one or more of a rigid sheathing, rigid metal sheathing, a perforated structure, an expanded wire mesh, a wire mesh, a plastic mesh, or a screen. Guard structure 150 may be perforated. The guard structure 150 (e.g., wire mesh, wire, plastic mesh or screen of guard structure 150) may have a thickness of approximately 0.020 inches to 0.040 inches. In some embodiments, guard structure 150 allows airflow into a space below a solar panel without letting animals or foreign material into the space. Guard structure 150 may be made of metal and/or plastic. In some embodiments, guard structure 150 is injection-molded plastic. Guard structure 150 may include a coated wire screen (e.g., a wire screen coated in plastic).

Solar panel guard system 100 may include one or more fastening devices 142. The one or more fastening devices 142 may be configured to removably secure a guard structure 150 to a leg 130 of a bracket 110 via an opening of the guard structure 150. In some embodiments, one or more fastening devices 142 are fastening device 142a and fastening device 142b. Fastening device 142a and fastening device 142b may be substantially identical. Fastening device 142a and fastening device 142b may be configured to removably attach to a leg 130 of a bracket 110. In some embodiments, fastening device 142a and fastening device 142b are configured to attach to protruding component 140a and protruding component 140b respectively. Fastening device 142a and fastening device 142b may be threaded fasteners. In some embodiments, fastening device 142a and fastening device 142b are threaded nuts. Fastening device 142a and fastening device 142b may be washers. Fastening device 142a and fastening device 142b may include a washer. In some embodiments, fastening device 142a and fastening device 142b include a washer and a nut. In certain embodiments, fastening device 142a and fastening device 142b are a bolt or a screw (e.g., see FIGS. 6A-B). Fastening device 142a and fastening device 142b may be friction fasteners.

FIG. 1B is a schematic diagram illustrating a front view of a bracket 110 of solar panel guard system 100, according to certain embodiments. Elements in FIG. 1B that have a similar reference number as elements in other FIGS. (e.g., FIG. 1A) may include similar features and/or similar functionality.

FIG. 2 is a schematic diagram illustrating a side view of bracket 210 of a solar panel guard system, according to certain embodiments. Elements in FIG. 2 that have a similar reference number as elements in other FIGS. (e.g., FIG. 1A, FIG. 1B) may include similar features and/or similar functionality.

In some embodiments, a solar panel guard system includes bracket 210. Bracket 210 may include similar features and/or functionality to bracket 110 of FIG. 1. Bracket 210 may include a clip 120. The clip 120 may be a clip structure. Bracket 210 may include a leg 130. The leg 130 may be a leg structure. In some embodiments, clip 120 is oriented so as to be substantially parallel to leg 130. Clip 120 may attach to a lip of a solar panel. Leg 130 may extend from clip 120. In some embodiments, leg 130 extends substantially downwards from clip 120 when bracket 210 is removably attached to a solar panel. In some embodiments, leg 130 extends from clip 120 in a direction substantially parallel to clip 120.

FIG. 3 is a schematic diagram illustrating a side view of bracket 310 of a solar panel guard system, according to certain embodiments. Elements in FIG. 3 that have a similar reference number as elements in other FIGS. (e.g., FIG. 1A, FIG. 1B, FIG. 2) may include similar features and/or similar functionality.

A solar panel guard system may include bracket 310. Bracket 310 may include similar features and/or functionality to bracket 110 of FIG. 1 and/or bracket 210 of FIG. 2. Bracket 310 may include a clip 120. The clip 120 may be a clip structure. Bracket 310 may include leg 130. Clip 120 may be oriented substantially parallel to leg 130.

Clip 120 of bracket 310 may include two components (e.g., planar component 370 and curved component 380). The two components may be connected by a joint. Clip 120 may include a planar component 370. The planar component 370 may be the first distal end of bracket 310. Planar component 370 may be integral to bracket 310 and be an extension of leg 130. Clip 120 may include a curved component 380. Planar component 370 and curved component 380 may be disposed at a first distal end of bracket 310. Planar component 370 and curved component 380 may be configured to grasp a lip of a solar panel. A lip of a solar panel may be squeezed between planar component 370 and curved component 380 when bracket 310 is installed on a solar panel. Planar component 370 and curved component 380 may form clip 120.

Curved component 380 may be attached to planar component 370 (e.g., leg 130) by a joint. The joint may be a welded joint. In some embodiments, curved component 380 is attached to planar component 370 by welded joint 360. Welded joint 360 may be a weld joint. Welded joint 360 may be a joint made by either gas metal arc welding (GMAW), gas tungsten arc welding (GTAW), and/or the like. In some embodiments, welded joint 360 is an adhesive joint. In other embodiments, welded joint 360 may be a joint created by one or more mechanical fasteners.

In some embodiments, the components of clip 120 apply a squeezing or clamping force to a lip of a solar panel. The squeezing or clamping force may retain clip 120 on the lip of the solar panel. Curved component 380 and/or planar component 370 may elastically deform and apply the squeezing or clamping force to the lip of the solar panel responsive to the elastic deformation. In some embodiments, welded joint 360 elastically deforms for either curved component 380 or planar component 370 or both curved component 380 and planar component 370 to apply the squeezing or clamping force to one or more surfaces of a lip of a solar panel.

Figure 4A:
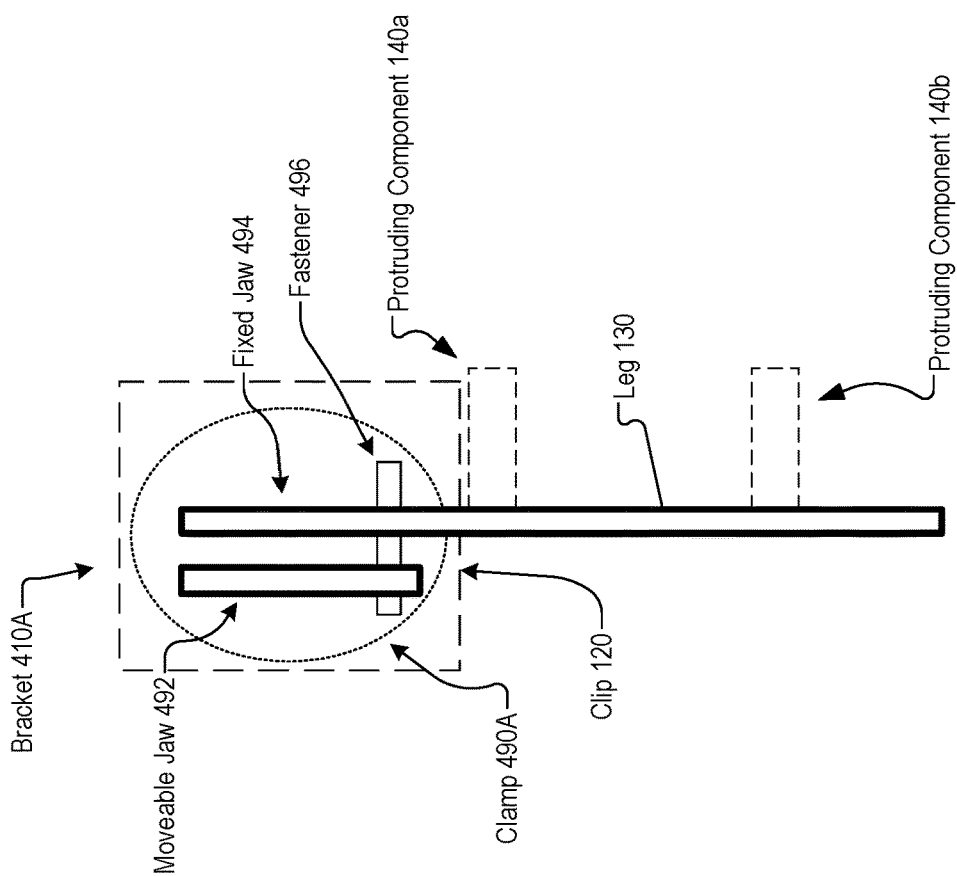
FIG. 4A is a schematic diagram illustrating a side view of a bracket of a solar panel guard system, according to certain embodiments.

FIG. 4A is a schematic diagram illustrating a side view of bracket 410A of a solar panel guard system, according to certain embodiments. Elements in FIG. 4A that have a similar reference number as elements in other FIGS. (e.g., FIG. 1A, FIG. 1B, FIG. 2, FIG. 3) may include similar features and/or similar functionality.

Bracket 410A may include similar features and/or functionality to bracket 110 of FIG. 1 and/or brackets 210 of FIG. 2 or 310 of FIG. 3. Bracket 410A may include a clamp 490A. The clamp 490A may be a clamp structure. Clamp 490A may be disposed at a first distal end of bracket 410A. Bracket 410A may include leg 130. In some embodiments, clamp 490A may be oriented substantially parallel to leg 130. In other embodiments, clamp 490A may be oriented substantially perpendicular to leg 130. Clamp 490A may be at a first distal end of bracket 410A. Leg 130 may extend from clamp 490A to a second distal end of bracket 410A.

Clamp 490A may include one or more jaws (e.g., jaw structures, clamping structures, structures having surfaces that are substantially parallel to each other, squeezing structures, etc.). The one or more jaws of clamp 490A may be one or members. Clamp 490A may include moveable jaw 492, and fixed jaw 494. Moveable jaw 492 may be a non-stationary member of clamp 490A. Fixed jaw 494 may be a stationary member of clamp 490A. Fixed jaw 494 may be integral to leg 130. Clamp 490A may include a fastener 496 (e.g., screw, tightening screw, bolt, etc.). The fastener 496 may draw moveable jaw 492 toward and in proximity to fixed jaw 494. When moveable jaw 492 can no longer be drawn closer to fixed jaw 494 due to moveable jaw 492 contacting an immovable surface, the fastener 496 may tighten one or more clamping surfaces of clamp 490A. Clamp 490A may create a clamping force on one or more surfaces of a lip of a solar panel. The clamping force may retain bracket 410A in its installed position on the solar panel. Clamp 490A may attach bracket 410A to a solar panel.

Moveable jaw 492 and fixed jaw 494 may have clamping surfaces. The clamping surfaces of moveable jaw 492 and/or fixed jaw 494 may be covered with a lining. In some embodiments, the lining may be rubber or a rubberized compound. Fastener 496 may be a screw. Fastener 496 may be accessed from an outboard side (i.e., an exterior side of the solar panel guard system) of bracket 410A. In some embodiments, moveable jaw 492 may move responsive to the turning of fastener 496. Moveable jaw 492 may be drawn toward fixed jaw 494 responsive to the turning of fastener 496. When moveable jaw 492 is drawn toward fixed jaw 494, the clamping surfaces of moveable jaw 492 and fixed jaw 494 may create a clamping force. Moveable jaw 492 and fixed jaw 494 may become fixed in spatial relationship (e.g., the position of moveable jaw 492 in relation to fixed jaw 494 becomes fixed) responsive to the turning and subsequent tightening of fastener 496. The clamping force may hold bracket 410A to the solar panel.

FIG. 4B is a schematic diagram illustrating bracket 410B of a solar panel guard system, according to certain embodiments. Elements in FIG. 4B that have a similar reference number as elements in other FIGS. (e.g., FIG. 1A, FIG. 1B, FIG. 2, FIG. 3, FIG. 4A) may include similar features and/or similar functionality. Bracket 410B may be a variant of bracket 110 of FIG. 1. Bracket 410B may include clamp 490B. Clamp 490B may be a mirror of clamp 490A and may otherwise be substantially the same as clamp 490A. Bracket 410B may include fastener 496. In some embodiments, fastener 496 may be accessed from an inboard side of bracket 410B.

FIG. 5A is a schematic diagram illustrating clamp 490A of bracket 410A of a solar panel guard system, according to certain embodiments. Clamp 490B of bracket 410B of a solar panel guard system may be a mirror image of clamp 490A and may be substantially the same as clamp 490A. Elements in FIG. 5A that have a similar reference number as elements in other FIGS. (e.g., FIG. 1A, FIG. 1B, FIG. 2, FIG. 3, FIG. 4A, FIG. 4B) may include similar features and/or similar functionality.

Clamp 490A may include one or more clamping surfaces. Clamp 490A may include a moveable jaw. The moveable jaw may move relative to a fixed jaw or a leg of bracket 410A. In some embodiments, the moveable jaw is moveable jaw 492. Moveable jaw 492 may be a non-stationary member of clamp 490A. Moveable jaw 492 may make up at least one clamping surface of clamp 490A. Clamp 490A may include a fixed jaw. The fixed jaw may be fixed to the leg of bracket 410A. The fixed jaw may be an extension of the leg of bracket 410A. In some embodiments, the fixed jaw is fixed jaw 494. Fixed jaw 494 may be a stationary member of clamp 490A. Fixed jaw 494 may make up at least one clamping surface of clamp 490A. Clamp 490A may include a screw. In some embodiments, the screw is fastener 496. Fastener 496 may tighten one or more clamping surfaces of clamp 490A. Fastener 496 may tighten one or more clamping surfaces of clamp 490A onto a lip of a solar panel. Fastener 496 may tighten moveable jaw 492 and fixed jaw 494. Moveable jaw 492 and fixed jaw 494 may become fixed in spatial relationship responsive to the tightening of the one or more clamping surface of clamp 490A.

Moveable jaw 492 may include an extension lever. The extension lever may be located near a first distal end of moveable jaw 492. The extension lever may provide leverage to moveable jaw 492. Leverage provided to moveable jaw 492 may increase the clamping force exerted by moveable jaw 492. In some embodiments, the extension lever is moveable jaw extension lever (MJEL) 593. MJEL 593 may be a protruding extension on moveable jaw 492. MJEL 593 may protrude from a distal end of moveable jaw 492. MJEL 593 may protrude substantially perpendicular to the face of the clamping surface of moveable jaw 492. MJEL 593 may protrude substantially an entire width of moveable jaw 492. MJEL 593 may have a substantially pointed tip. In some embodiments, MJEL 593 has a substantially rounded tip. The tip of MJEL 593 may contact a surface of fixed jaw 494 when fastener 496 is turned in a direction to tighten clamp 405. In some embodiments, the contacting of a surface of fixed jaw 494 by MJEL 593 creates leverage in the moveable jaw 492 to exert a greater clamping force on a surface of a solar panel lip.

FIG. 5B is a schematic diagram illustrating a moveable jaw of a clamp of a bracket of a solar panel guard system, according to certain embodiments. Elements in FIG. 5B that have a similar reference number as elements in other FIGS. (e.g., FIG. 1A, FIG. 1B, FIG. 2, FIG. 3, FIG. 4A, FIG. 4B, FIG. 5A) may include similar features and/or similar functionality. FIG. 5B may show moveable jaw 492, according to certain embodiments.

Moveable jaw 492 may include one or more extensions. Moveable jaw 492 may include a first extension. The first extension may be MJEL 593 disposed at a first distal end of moveable jaw 492. Moveable jaw 492 may also include a second extension. The second extension may be a contact extension disposed near a second distal end of moveable jaw 492. In some embodiments, the contact extension is moveable jaw contact extension (MJCE) 595. MJCE 595 may extend substantially perpendicular to an inside face of moveable jaw 492. MJCE 595 may extend across substantially an entire width of moveable jaw 492. MJCE 595 may have a substantially flat tip. In some embodiments, the tip of MJCE 595 is the clamping surface of moveable jaw 492. MJCE 595 may serve to substantially decrease an area of the clamping surface of moveable jaw 492. The decreased are of the clamping surface of moveable jaw 492 may exert a greater pressure on a surface of a lip of a solar panel to which bracket 410A is installed or attached.

FIG. 6A is a schematic diagram illustrating a side view of a solar panel guard system, according to certain embodiments. Elements in FIG. 6A that have a similar reference number as elements in other FIGS. (e.g., FIG. 1A, FIG. 1B, FIG. 2, FIG. 3, FIG. 4A, FIG. 4B) may include similar features and/or similar functionality.

A solar panel guard system may include bracket 610. Bracket 610 may include similar features and/or functionality to bracket 110 of FIG. 1, bracket 210 of FIG. 2, bracket 310 of FIG. 3, and/or 410 of FIG. 4. Bracket 610 may further include one or more portions for attaching a guard or barrier structure. The one or more portions may be one or more openings in leg 130. Leg 130 may form an opening configured to receive a fastening device. The opening may be a hole. A first hole may be located in leg 130 proximate to a first distal end of the bracket, while a second hole may be located in leg 130 proximate to a second distal end of the bracket. In some embodiments, the first hole is opening 632a and the second hole is opening 632b.

Opening 632a and opening 632b may each be a hole in leg 130. Opening 632a and opening 632b may be configured to each accept a fastening device. In some embodiments, opening 632a and opening 632b are threaded. Opening 632a and opening 632b may be configured to accept a threaded fastener such as a bolt or screw. In some embodiments, the threaded fastener fastens a guard or barrier to bracket 610. In some embodiments, opening 632a and opening 632b each include a nut.

One or more nuts may be attached to a side of leg 130. The one or more nuts may be threaded and configured to each accept a fastening device. The fastening device may be a threaded fastener such as a screw or bolt. In some embodiments, the one or more nuts are attachment nut 634a and attachment nut 634b. Attachment nut 634a and attachment nut 634b may be standard sized nuts. Attachment nut 634a and attachment nut 634b may be internally threaded. Attachment nut 634a and attachment nut 634b may accept a threaded fastener. In some embodiments, the threaded fastener fastens a guard or barrier to bracket 610. Attachment nut 634a and attachment nut 634b may be attached to leg 130 by welding, adhesive, and/or by a mechanical fastener. In some embodiments, attachment nut 634a and attachment nut 634b are attached to leg 130 by GMAW, GTAW, and/or the like.

Openings 632 may be configured to connect fastening devices 142 to leg 130. Fastening devices 142 may be fasteners such as screws or bolts. In some embodiments, fastening devices 142 pass through the guard structure 150 to connect to the leg 130. Fastening devices 142 may be tightened into openings 632.

FIG. 6B is a schematic diagram illustrating bracket 610 of a solar panel guard system, according to certain embodiments. FIG. 6B may show a face of bracket 610. Elements in FIG. 6B that have a similar reference number as elements in other FIGS. (e.g., FIG. 1A, FIG. 1B, FIG. 2, FIG. 3, FIG. 4A, FIG. 4B, FIG. 6A) may include similar features and/or similar functionality.

Figure 7:
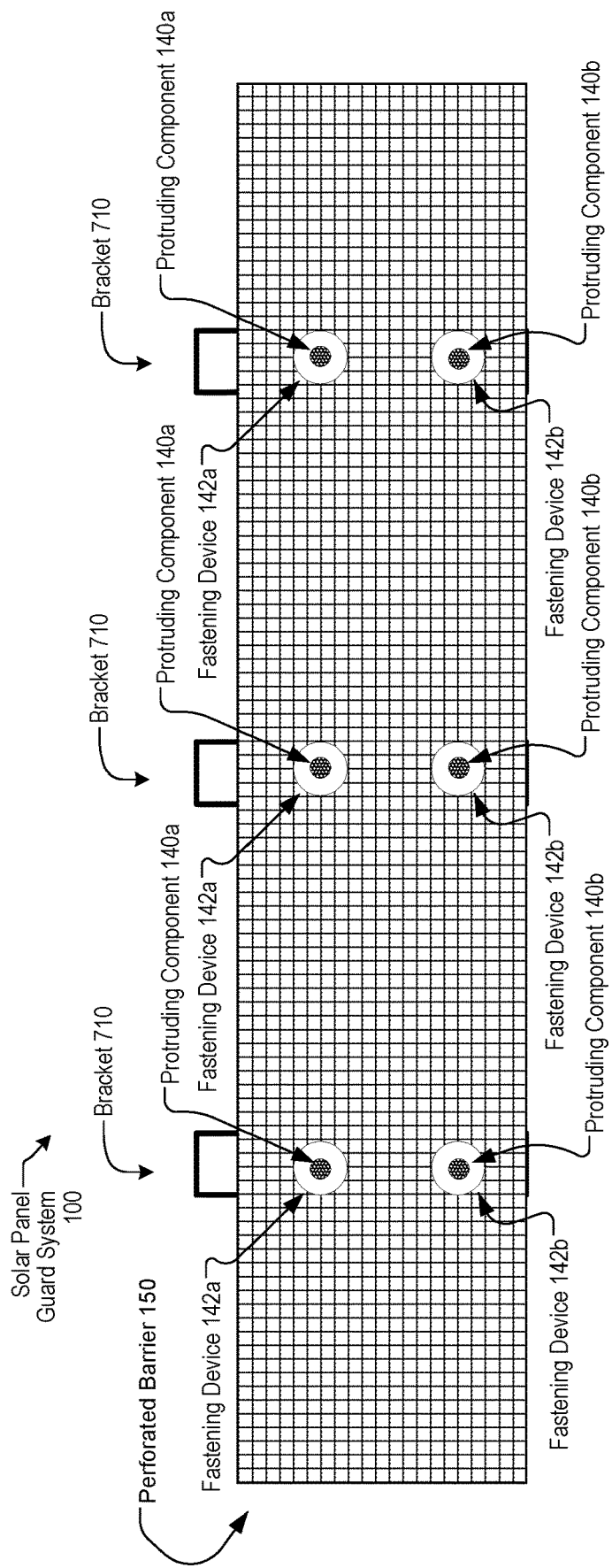
FIG. 7 is a schematic diagram illustrating front view of a solar panel guard system, according to certain embodiments.

FIG. 7 is a schematic diagram illustrating a front view of a solar panel guard system 100, according to certain embodiments. Elements in FIG. 7 that have a similar reference number as elements in other FIGS. (e.g., FIG. 1A, FIG. 1B, FIG. 2, FIG. 3, FIG. 4A, FIG. 4B, FIG. 6A, FIG. 6B) may include similar features and/or similar functionality.

In some embodiments, solar panel guard system 100 may include one or more brackets 710. The one or more brackets 710 may include be one or more of bracket 110, bracket 210, bracket 310, bracket 410A, bracket 410B, and/or bracket 610. As an example, FIG. 7 shows three brackets 710. However, in many embodiments, solar panel guard system 100 includes more than three brackets 710. In some embodiments, solar panel guard system 100 includes less than three brackets 710. Solar panel guard system 100 may include one or more fastening devices 142 (e.g., a set of hardware or fasteners) for each bracket. In some embodiments, each bracket of solar panel guard system 100 may have one or more fastening devices 142 (e.g., companion hardware or fasteners) including protruding component 140a, protruding component 140b, fastening device 142a, and fastening device 142b. As an example, FIG. 7 shows three brackets 710 with corresponding fastening devices (e.g., companion hardware or fasteners).

Guard structure 150 may span gaps between brackets to which guard structure 150 is mounted. Guard structure 150 may resist deflection at points between the brackets to which guard structure 150 is mounted. In some embodiments, guard structure 150 is sufficiently rigid to prevent animals from pushing under guard structure 150. Animals may not be able to penetrate guard structure 150. FIG. 7 may show individual wires or members that compose guard structure 150. The individual wires or members may have a thickness of at least 0.020 inches.

Guard structure 150 may include one or more sections of a barrier or guard structure. One or more sections of a barrier or guard structure may be installed to form guard structure 150. The one or more sections of a barrier or guard structure may be installed on one or more brackets 710. The one or more sections of a barrier or guard structure of guard structure 150 may overlap at one or more portions configured to accept a corresponding fastening device. The overlapping of sections of a barrier may provide a greater hindrance to animals and foreign matter attempting to enter the space under a solar panel to which the solar panel guard system is mounted.

Figure 8:
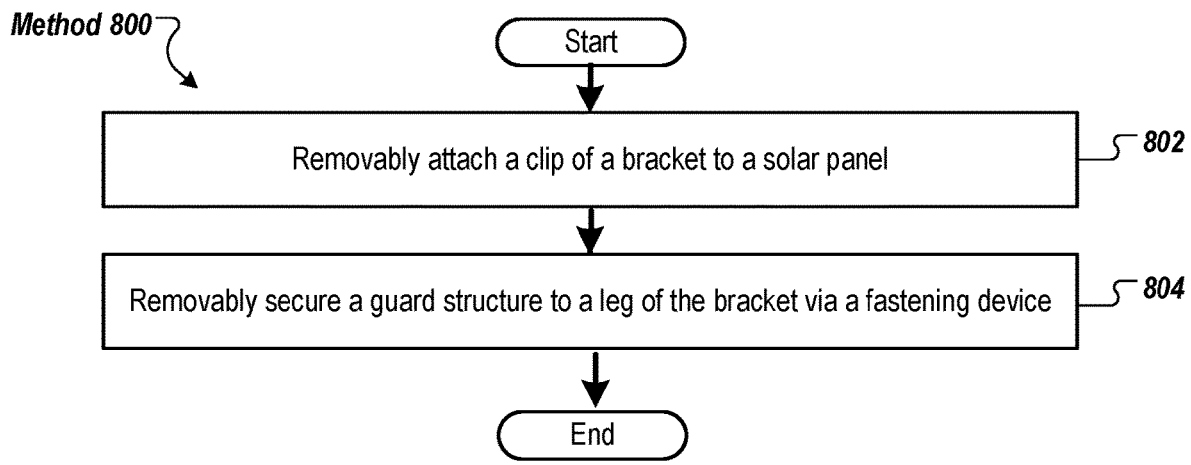
FIG. 8 is a flow diagram of a method associated with a solar panel guard system, according to certain embodiments.

FIG. 8 is a flow diagram of a method 800 associated with a solar panel guard system, according to certain embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

Referring to FIG. 8, at block 802 a clip of a bracket is removably attached to a solar panel. The clip of the bracket may configured to attach to a lip of a solar panel. The lip of the solar panel may be under a top surface of a solar panel. In some embodiments, bracket 110 is attached to the solar panel via clip 120. In some embodiments, the clip of the bracket may include a clamp (e.g., clamp 490A of bracket 410A or clamp 490B of bracket 410B).

In some embodiments, at block 802 multiple brackets are removably attached to the solar panel (e.g., around the perimeter of the solar panel). The brackets may include one or more of bracket 110, bracket 210, bracket 310, bracket 410A, bracket 410B, and bracket 610. One or more fasteners may be tightened to attach the one or more brackets to the solar panel. In some embodiments, a fastener on each of the clips of the one or more brackets is tightened. In other embodiments, a tightening screw of a clamp of each of the one or more brackets must be tightened.

At block 804, a guard structure is removably secured to a leg of the bracket via a fastening device.

In some embodiments, at block 804, a protruding component of a leg of the bracket is passed through an opening formed by a guard structure (e.g., guard structure 150). The guard structure may have an opening which aligns with a protruding component of the leg. The leg may have two or more protruding components.

In some embodiments, the leg of the bracket forms an opening. The opening of the guard structure is aligned with the opening of the leg. The leg may include a nut (e.g., see attachment nuts 634a-b of FIG. 6A) attached to the leg, where a channel through the nut aligns with the opening formed by the leg. In some embodiments, the leg forms two or more openings (e.g., openings 632a-b of FIGS. 6A-B) (e.g., that align with corresponding nuts attached to the leg and/or openings in the guard structure). In some embodiments, at block 804, a fastening device is passed through the opening formed by the guard structure and into the opening of the leg. The fastening device may be a screw, bolt, nail, or other fastener. The fastening device may be inserted into the opening formed by the guard structure and into the opening of the leg.

The passing a protruding component of the leg of the bracket and/or fastening device through an opening formed by the guard structure may include passing the protruding component and/or fastening device through one or more sections of the guard structure. In some embodiments, the protruding component and/or fastening device passes through multiple sections of the guard structure. One or more sections of the guard structure may be overlapped where the protruding component passes through. The overlapping sections of the guard structure may utilize the same protruding component of the leg and/or fastening device to be secured to the bracket.

In some embodiments, a fastening device is removably attached to the protruding component of the leg. Removably attaching a fastening device to the protruding component of the leg may include disposing a fastening device on the protruding component of the leg. In some embodiments, a nut is disposed on the protruding component of the leg. The nut may be a threaded nut or a friction nut. In some embodiments, fastening device 142a is disposed on protruding component 140a, and fastening device 142b is disposed on protruding component 140b. In other embodiments, a fastener is disposed in each of opening 632a and opening 632b. In those embodiments, the fastener may be a screw, a bolt, or a nail or other fastener.

Removably attaching a fastening device may further include securing the fastening device to the leg. This may result in fastening the guard structure to the leg of the bracket via the fastening device. In some embodiments, the fastening device is tightened onto the protruding component. In some embodiments, fastening device 142a is tightened onto protruding component 140a, and fastening device 142b is tightened onto protruding component 140b. In other embodiments, a first screw or bolt is tightened into opening 632a and a second screw or bolt is tightened into opening 632b. The first screw or bolt may engage threads disposed within attachment nut 634a and the second screw or bolt may engage threads disposed within attachment nut 634b. The guard structure may be secured to the bracket responsive to the tightening of the fastening device to the fastener of the leg.

Figure 9:
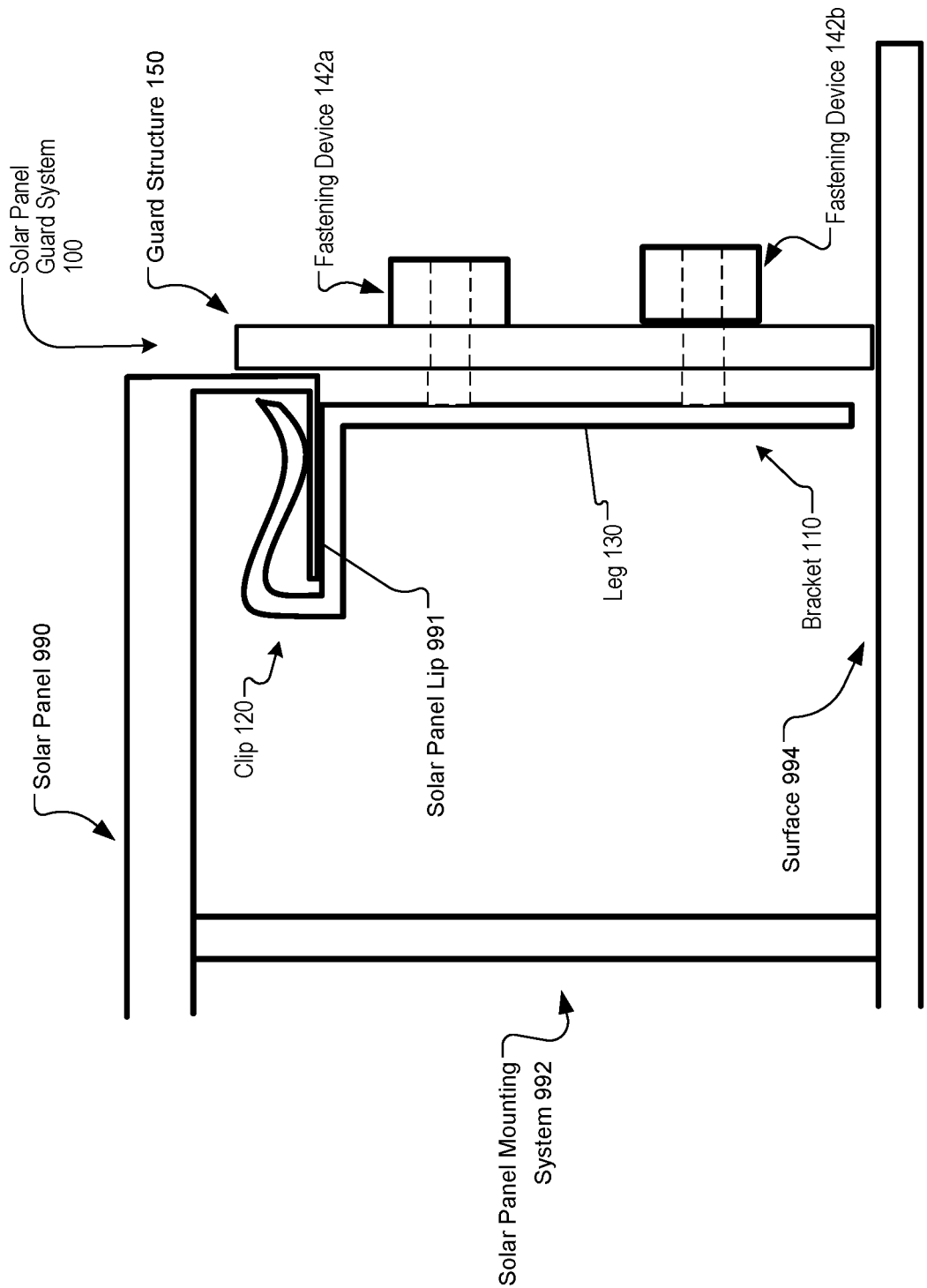
FIG. 9 is a schematic diagram illustrating a solar panel guard system installed on a solar panel, according to certain embodiments.

FIG. 9 is a schematic diagram illustrating a solar panel guard system 100 installed on a solar panel, according to certain embodiments. Elements in FIG. 9 that have a similar reference number as elements in other FIGS. (e.g., FIG. 1A, FIG. 1B, FIG. 2, FIG. 3, FIG. 4A, FIG. 4B, FIG. 6A, FIG. 6B, FIG. 7) may include similar features and/or similar functionality. FIG. 9 may show a side view of solar panel guard system 100 installed on a solar panel.

In some embodiments, solar panel guard system 100 is installed on a solar panel 990. Bracket 110 may be attached to a solar panel lip 991 by clip 120. In some embodiments, an upper edge of the guard structure 150 may be disposed above an upper surface of the clip 120. The upper edge of the guard structure 150 may be above the height of the solar panel lip 991. Guard structure 150 extending above the height of the solar panel lip may serve to attach the bracket 110 to the solar panel because when fastened in such a manner, there is not room for the clip 120 to slide off of the solar panel lip without the guard structure 150 interfering with the solar panel.

The solar panel may be mounted above a surface 994 by a solar panel mounting system 992. The surface 994 may be a roof of a building. In some embodiments, surface 994 is angled to the horizontal plane. The mounting of the solar panel to the surface by the solar panel mounting system 992 creates space between the solar panel and the surface. In some embodiments, solar panel guard system 100 encapsulates (e.g., encloses via guard structure 150) the space between the solar panel and the surface. The guard structure 150 may have an upper edge disposed proximate the solar panel and a lower edge proximate the surface. The guard structure 150 may prevent objects or material from entering the space between the solar panel and the surface.

FIG. 10 is a schematic diagram illustrating a bracket of a solar panel guard system, together with an extension, according to certain embodiments. Elements in FIG. 10 that have a similar reference number as elements in other FIGS. (e.g., FIG. 1A, FIG. 1B, FIG. 2, FIG. 3, FIG. 4A, FIG. 4B, FIG. 6A, FIG. 6B, FIG. 7, FIG. 9) may include similar features and/or similar functionality.

Leg extension 135 may be attached to bracket 110. Leg extension 135 may attach to leg 130. In some embodiments, leg extension 135 includes one or more portions configured to attach a fastening device to fasten guard structure 150 to the leg extension 135. In some embodiments, leg extension 135 includes protruding component 140c. In some embodiments, leg extension 135 includes an opening configured to fasten a fastening device such as a screw or bolt. Leg extension 135 may be fastened to leg 130 by a fastening device. In some embodiments, leg extension 135 allows bracket 110 to support a larger guard structure than bracket 110 would otherwise be able to support without leg extension 135.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc. as used herein are meant as labels to distinguish among different elements and can not necessarily have an ordinal meaning according to their numerical designation. When the term "about," "substantially," or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A solar panel guard system comprising:
a bracket comprising:
a clip disposed at a first distal end of the bracket, wherein the clip removably attaches to a lip of a solar panel; and
a leg comprising a body that extends from the clip to a second distal end of the bracket, wherein the leg further comprises a protrusion that extends from the body;
a guard structure comprising an upper edge to be disposed proximate the solar panel and a lower edge to be disposed proximate a surface that is disposed under the solar panel, wherein the guard structure is to prevent objects from entering under the solar panel; and
a fastening device, wherein the protrusion of the leg passes through the guard structure and connects to the fastening device to secure the guard structure between the body of the leg and the fastening device.

2. The solar panel guard system of claim 1, wherein the clip is oriented substantially perpendicular to the body of the leg of the bracket.

3. The solar panel guard system of claim 1, wherein the clip is oriented substantially parallel to the body of the leg of the bracket.

4. The solar panel guard system of claim 1, wherein the clip comprises a clamp structure that provides a clamping force to removably attach the bracket to the solar panel.

5. The solar panel guard system of claim 1, wherein the protrusion of the leg protrudes substantially perpendicularly from the body of the leg.

6. The solar panel guard system of claim 1, wherein the protrusion of the leg protrudes substantially perpendicular from the body of the leg, and wherein a threaded outer surface of the protrusion secures to a threaded inner surface of the fastening device to secure the guard structure between the body of the leg and the fastening device.

7. The solar panel guard system of claim 1, wherein:
the guard structure comprises one or more of a perforated barrier, metal sheathing, wire mesh, expanded wire mesh, plastic mesh, or a screen.

8. The solar panel guard system of claim 1, wherein the upper edge of the guard structure is disposed above an upper surface of the clip responsive to the guard structure being secured to the leg of the bracket, and wherein the guard structure holds the bracket in place on the solar panel responsive to the guard structure being secured to the leg.

9. The solar panel guard system of claim 1, wherein the leg of the bracket further comprises a second protrusion that passes through an opening of an extension structure and attaches to a second fastening device to secure the extension structure between the body of the leg and the second fastening device, wherein an extension structure protrusion of the extension structure passes through the guard structure and attaches to a third fastening device to secure the guard structure between an extension structure body of the extension structure and the third fastening device.

10. A bracket of a solar panel guard system, the bracket comprising:
a clip disposed at a first distal end of the bracket, wherein the clip removably attaches to a lip of a solar panel; and
a leg comprising a body that extends from the clip to a second distal end of the bracket, wherein the leg further comprises a protrusion that extends from the body, wherein the protrusion of the leg passes through a guard structure and connects to a fastening device to secure the guard structure between the body of the leg and the fastening device, and wherein the guard structure prevents objects from entering under the solar panel.

11. The bracket of claim 10, wherein the clip is oriented substantially perpendicular to the body of the leg.

12. The bracket of claim 10, wherein the clip is oriented substantially parallel to the body of the leg.

13. The bracket of claim 10, wherein the clip comprises a clamp structure that provides a clamping force to removably attach the bracket to the solar panel.

14. The bracket of claim 10, wherein the protrusion of the leg protrudes substantially perpendicular from the body of the leg.

15. The bracket of claim 10, wherein the protrusion of the leg protrudes substantially perpendicular from the body of the leg.

16. The bracket of claim 10, wherein the leg further comprises a second protrusion that passes through an opening of an extension structure and attaches to a second fastening device to secure the extension structure between the body and the second fastening device, wherein an extension structure protrusion of the extension structure passes through the guard structure and attaches to a third fastening device to secure the guard structure between an extension structure body of the extension structure and the third fastening device.

17. The bracket of claim 10, wherein a threaded outer surface of the protrusion secures to a threaded inner surface of the fastening device to secure the guard structure between the body of the leg and the fastening device.

18. A method comprising:
removably attaching a clip of a bracket to a lip of a solar panel, wherein the clip is disposed at a first distal end of the bracket and a leg of the bracket comprises a body that extends from the clip to a second distal end of the bracket, wherein the leg further comprises a protrusion that extends from the body;
passing the protrusion of the leg through a guard structure; and
removably connecting a fastening device to the protrusion to secure the guard structure between the body of the leg of the bracket and the fastening device to cause an upper edge of the guard structure to be disposed proximate the solar panel and to cause a lower edge of the guard structure to be disposed proximate a surface disposed under the solar panel to prevent objects from entering under the solar panel.

19. The method of claim 18, wherein the removably attaching of the clip to the lip of the solar panel comprises tightening a clamp structure of the bracket to provide a clamping force to removably secure the bracket to the lip of the solar panel.

20. The method of claim 18, wherein a threaded outer surface of the protrusion secures to a threaded inner surface of the fastening device to secure the guard structure between the body of the leg and the fastening device.

* * * * *